(12) United States Patent
Winefordner et al.

(10) Patent No.: US 8,944,502 B2
(45) Date of Patent: Feb. 3, 2015

(54) SADDLE FOR A BICYCLE

(75) Inventors: Carl Winefordner, Laguna Beach, CA (US); Frank Hermansen, Laguna Beach, CA (US)

(73) Assignee: Crank Brothers, Inc., Laguna Beach, CA (US)

(*) Notice: Subject to any disclaimer, the term of this patent is extended or adjusted under 35 U.S.C. 154(b) by 73 days.

(21) Appl. No.: 13/818,616

(22) PCT Filed: Aug. 30, 2010

(86) PCT No.: PCT/IB2010/053886
§ 371 (c)(1),
(2), (4) Date: May 2, 2013

(87) PCT Pub. No.: WO2012/028901
PCT Pub. Date: Mar. 8, 2012

(65) Prior Publication Data
US 2014/0035332 A1 Feb. 6, 2014

(51) Int. Cl.
*B62J 1/02* (2006.01)
*B62J 1/08* (2006.01)
*B62J 1/00* (2006.01)
*B62J 1/10* (2006.01)

(52) U.S. Cl.
CPC .... *B62J 1/08* (2013.01); *B62J 1/00* (2013.01); *B62J 1/10* (2013.01)
USPC .......................................... 297/202; 297/205

(58) Field of Classification Search
CPC ........................................................ B62J 1/08
USPC ............................... 297/195.1–215.16
See application file for complete search history.

(56) References Cited

U.S. PATENT DOCUMENTS

| | | | |
|---|---|---|---|
| 5,921,624 A | 7/1999 | Wu | |
| 5,988,741 A * | 11/1999 | Voss et al. | 297/215.15 |
| 6,007,148 A | 12/1999 | Yu | |
| 7,431,391 B2 * | 10/2008 | Hsiao | 297/215.15 |
| 8,042,823 B2 * | 10/2011 | Cusack | 297/195.1 X |
| 8,083,289 B2 * | 12/2011 | Chang | 297/215.15 |
| 8,727,436 B2 * | 5/2014 | Connors | 297/195.1 |
| 8,764,106 B2 * | 7/2014 | Bigolin | 297/215.14 |
| 2011/0210231 A1 * | 9/2011 | D'Aluisio | 297/195.1 X |

FOREIGN PATENT DOCUMENTS

| | | |
|---|---|---|
| DE | 202005018979 | 5/2007 |
| EP | 1256514 | 11/2002 |
| GB | 914345 | 1/1963 |

* cited by examiner

*Primary Examiner* — Rodney B White
(74) *Attorney, Agent, or Firm* — Haynes and Boone, LLP

(57) ABSTRACT

Saddle for bicycle, comprising a shaped shell (2) for the support of the user and at least a rail (3) for connecting the saddle to a seat post, the saddle comprises fixing detachable means (4) of the rail to the shell, and means of regulation (28) of the rigidity of the shell.

13 Claims, 5 Drawing Sheets

Fig. 3
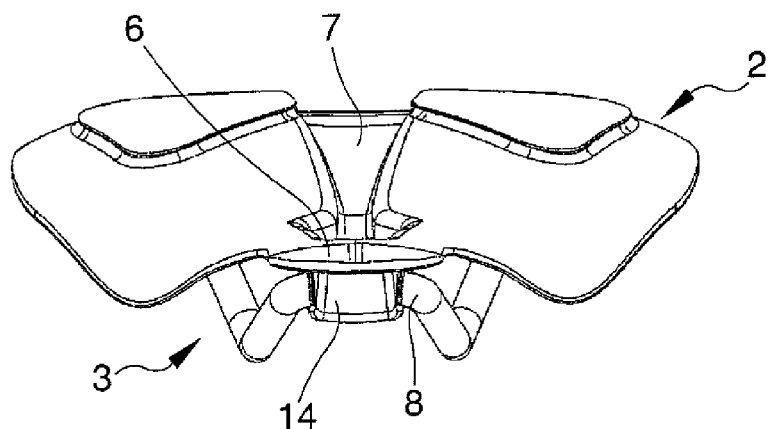
Fig. 4
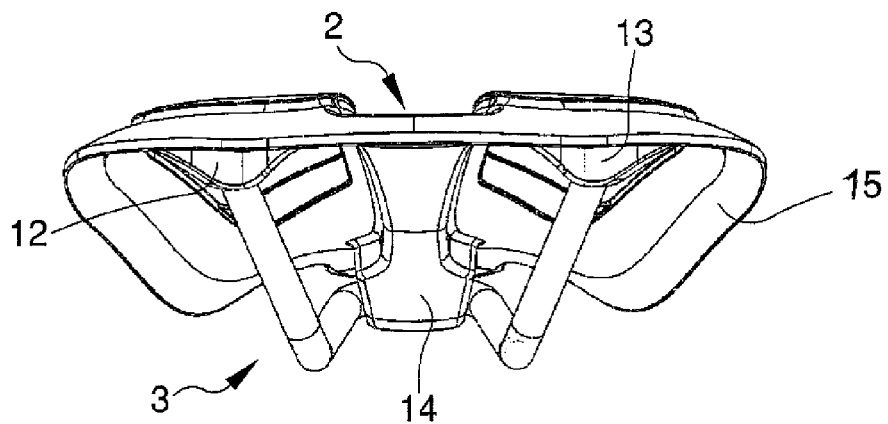
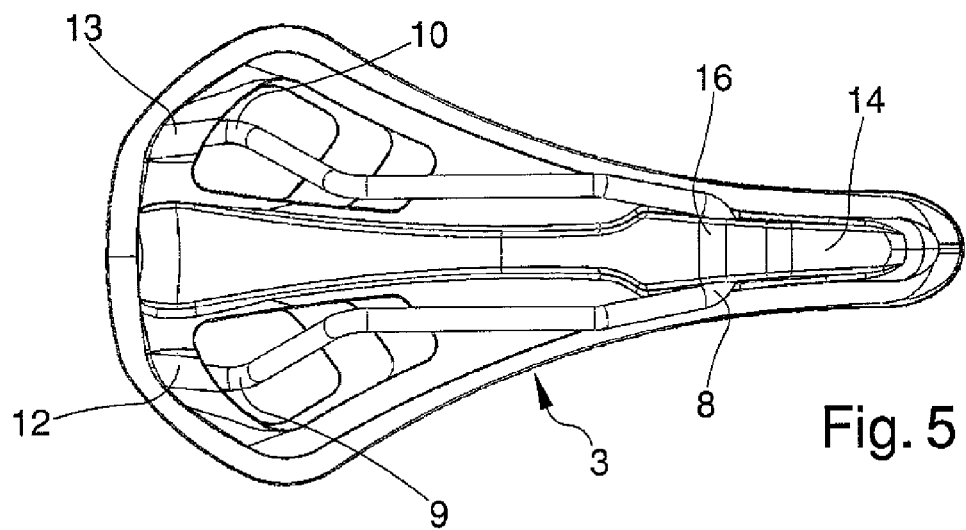
Fig. 5

SADDLE FOR A BICYCLE

RELATED APPLICATION

This U.S. patent application claims priority to and the benefit of PCT patent application PCT/IB2010/053886, filed Aug. 30, 2010, which is incorporated herein by reference in it entirety.

TECHNICAL FIELD OF THE INVENTION

The invention relates to a saddle for a bicycle. More particularly, the invention relates to a saddle with support rail fixable to the seat post of the bicycle.

BACKGROUND ART

It is known saddles for bicycle comprising a sort of shaped shell, for supporting the user, and a support of such shell constituted by a rail, fixed to the inferior surface of the same shell, that acts as connection to the seat post of the bicycle. For instance, such connection can be of the type with adjustable position by means of clamp means per se known.

In this type of saddles the rail, typically constituted by a cylindrical U-shaped bar, is rigidly fixed below the shell so that its folded portions connects to the front nose of the saddle, and so that its free extremities connects it to the shell below the rear portion of the seat.

In the known saddles the connection between the rail and the shell is of permanent type, for instance with interlocking joints, or still through welding, gluing, etc.

Insofar, if the rail suffers a damage during the use, the user is forced to replace the whole saddle.

Besides the user cannot compose, according to his own preference and requirements, a shell and a rail freely selected, but he is forced to purchase a saddle with shell and rail of predetermined characteristics and not modifiable. This fact constitutes a non negligible drawback, particularly for experienced and passionate users that typically choose every single component of the bicycle according their own tastes.

Sometimes, during a crash such as during off road riding, the shell becomes detached from the rail without damaging the rail or the shell. However, reassembling the rail into the shell is not possible without industrial fixtures, even though both components might be without damage. The rider cannot reassemble their saddle, yet they might be in the middle of a ride, far from civilization.

Besides the known saddles presents other technical drawbacks: one among these is represented by the fact that in the traditional saddles the weight of the rail always constitutes a significant fraction of the general weight of the saddle. In order to try to solve this drawback it has been realized rails with tubular sections, or still choosing a lower density material, but the result was not fully satisfactory, unless making use of material of very high quality and therefore extremely expensive.

A drawback is still constituted by the fact that in the traditional saddles it is not possible to adjust the rigidity of the discretion shell of the user.

Indeed some saddles are provided with means suitable for allowing this regulation, but they are of complicated construction, expensive, heavy and few functional, and therefore they don't succeed in satisfying the different requirements of the users.

A further limit of the traditional saddles is represented by the fact that the nose of the saddle or rather its anterior portion, is felt by some users as excessively rigid: such users are typically those people that practise mountain biking and triathlon, or also other disciplines in which the bicyclist is often brought to sit on the nose of the saddle.

PURPOSES OF THE INVENTION

The main technical object of the present invention is to improve the state of the art.

Within such technical object, it is a purpose of the present invention to realize a saddle for bicycle that allows the user to get off the rail from the shell and to reassemble it to his own discretion and in relationship to his own demands.

Another purpose of the present invention is to set a saddle for bicycle that allows the user to regulate in simple, practical and economic way the rigidity of the shell in relationship to his own tastes and his own needs of use.

Still a purpose of the present invention is to realize a saddle for bicycle of meaningfully reduced weight in comparison to that of the traditional saddles.

A further purpose of the present invention is to realize a saddle for bicycle of more comfortable and pleasant use in comparison to the traditional saddles.

A further purpose of the present invention is to realize a saddle for bicycle wherein the rail can be easily replaced using ordinary tools.

These and other purposes are all reached by the saddle for bicycle according to one or more of the attached claims.

A first advantage achieved by the invention consists in the fact that the rail of the saddle can be separated by the shell and reassembled in rapid and simple way from the same user, or from a technician, for needs of reparation, substitution or other.

Another advantage of the present invention consists in the fact that the rigidity of the shell of the saddle can be regulated by the user on the basis of his own tastes, in a simple and effective way.

Another advantage of the present invention consists in the fact that the saddle possesses a definitely reduced weight in comparison to that of the traditional saddles.

A further advantage consists in the fact that the saddle is characterized by comfort feeling and pleasantness of use, with particular reference to the increased flexibility of the nose of the saddle.

BRIEF DESCRIPTION OF THE DRAWINGS

These and further advantages will be better understood by every technician from the description that follows and from the attached drawings, given as non limitative example, in which:

FIG. 3 is a front view of the saddle;

FIG. 4 is a rear view of the saddle;

FIG. 5 is a lower view of the saddle;

FORMS OF REALIZATION OF THE INVENTION

Figure 1:
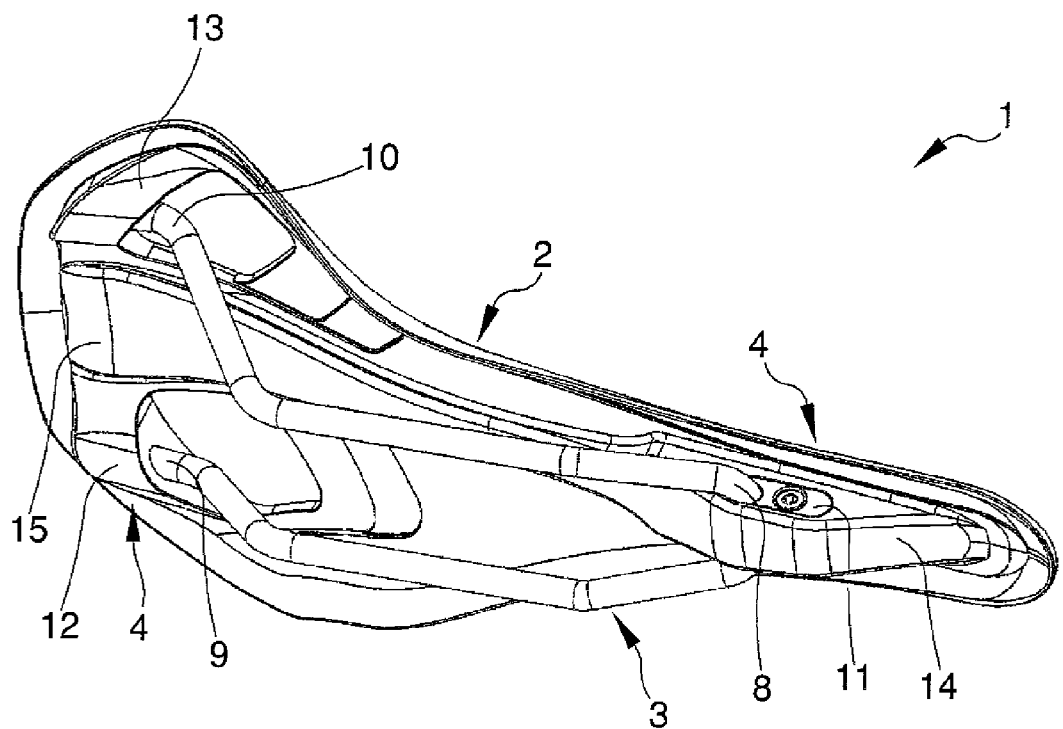
FIG. 1 is a perspective view of the saddle for bicycle according to the present invention.
Figure 2:
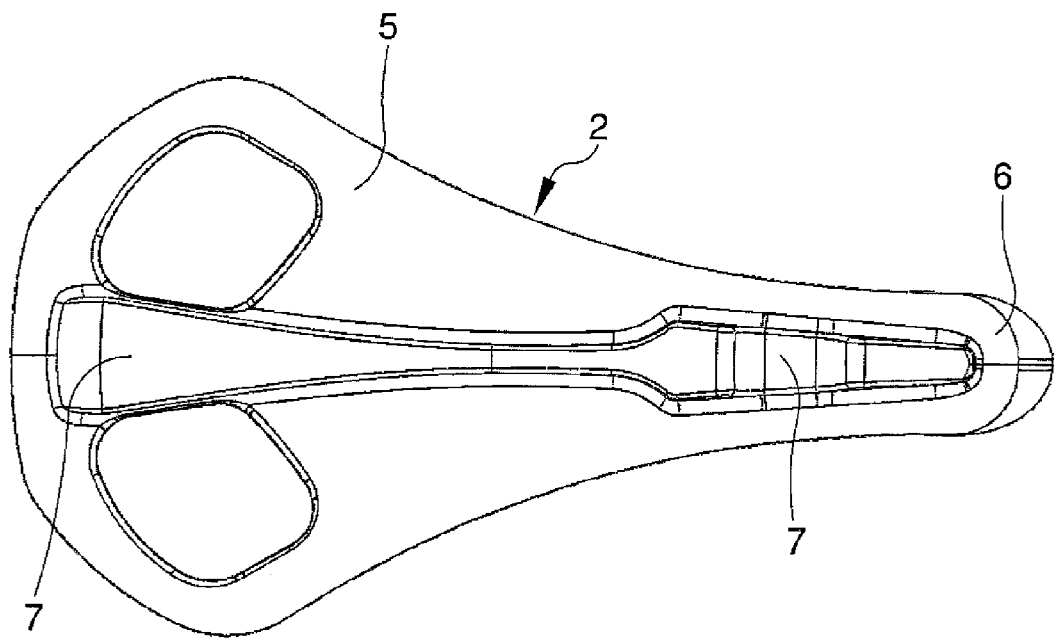
FIG. 2 is a plan view of the saddle.
Figure 6:
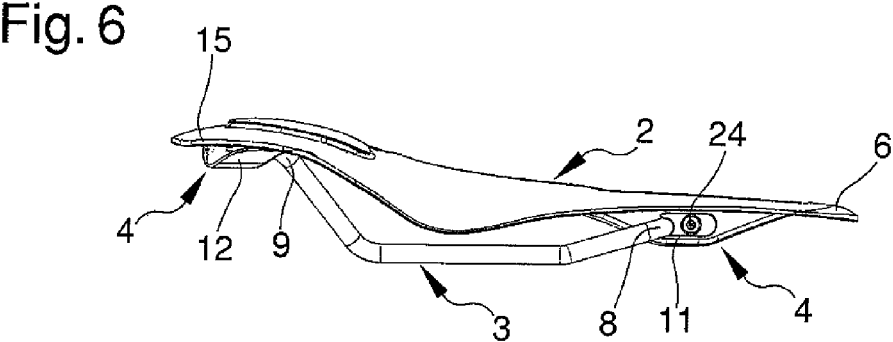
FIG. 6 is a side view of the saddle according to the invention.

Referring to FIGS. 1-10, with reference numeral 1 is indicated a saddle for bicycle according to the invention.

The saddle object of the present invention can be mounted on any kind of bicycle, without any limitation, from racing bicycles to touring bicycles, from children bicycles to adults bicycles.

The saddle 1 comprises a shaped shell, indicated with reference numeral 2, and a rail, indicated with reference numeral 3, suitable for connection to the seat post, this last not represented in the figures for simplicity, but of essentially known type. Such connection can for instance be realized with clamp means, also known and not represented for simplicity in the figures, that allow the regulation of the position of the saddle relative to the seat post.

The saddle 1 includes fixing detachable means of the rail 3 to the shell 2, indicated with reference numeral in the attached figures. The aforesaid fixing detachable means 4 allow to achieve numerous remarkable technical advantages, which will be illustrated and clarified in the sequel.

The shell 2 conforms a back seat 5 for supporting the user, and it progressively tightens to delineate an anterior nose 6. On the superior surface of the shell 2 longitudinal unloading grooves 7 are provided, of various forms and dimensions—visible particularly in the FIGS. 2, 3—that allow to alleviate the contact pressure on critical zones of the body of the user, as for instance the prostate zone.

The shell 2 can be realized in synthetic material of the type of the plastics, or in metallic material, or in any other material of appropriate characteristics of mechanical resistance and rigidity.

On the shell 2 are usually brought and fixed coverings, stuffings, and/or any other necessary element to make the sitting of the user comfortable; such elements are not represented for simplicity in the figures, being of absolutely known and traditional kind.

The rail 3, as can be clearly observed for instance in FIG. 1, may have substantially circular or tubular transversal section of opportune diameter, and it comprises a "U" shaped anterior portion 8 and two rear portions 9, 10, free to the extremities and "S" shaped. The rail 3 can be realized for instance in metallic material, or in synthetic material of the type of the plastics or in any other material of appropriate mechanical characteristics.

The fixing detachable means 4 include a front slot 11, suitable for detachably inserting the anterior portion of the rail 3, and rear slots 12, 13 suitable for detachably inserting the rear portions 9, 10 of said rail 3.

The aforesaid fixing detachable means 4 allow the user to separate, with rapidity and simplicity, the rail 3 from the shell 2, and they allow with the same facility to reassemble the rail 3 on the same shell 2. This operation can be performed, for instance, to the purpose to replace the rail 3 if damaged, or to the purpose to mount on the shell 2 of the saddle 1 a rail of different material and/or with different characteristics, for example with a different weight, with a different rigidity or other.

The front slot 11 of the fixing detachable means 4 is eyelet shaped, it is realized passing in transversal direction and it extends substantially parallel to the surface of the shell 2. Such front slot 11 is realized in a sort of embossing 14, of opportune transversal thickness, conformed by the lower surface 15 of the shell 2 and according to a plan substantially perpendicular to the shell 2.

Figure 7:
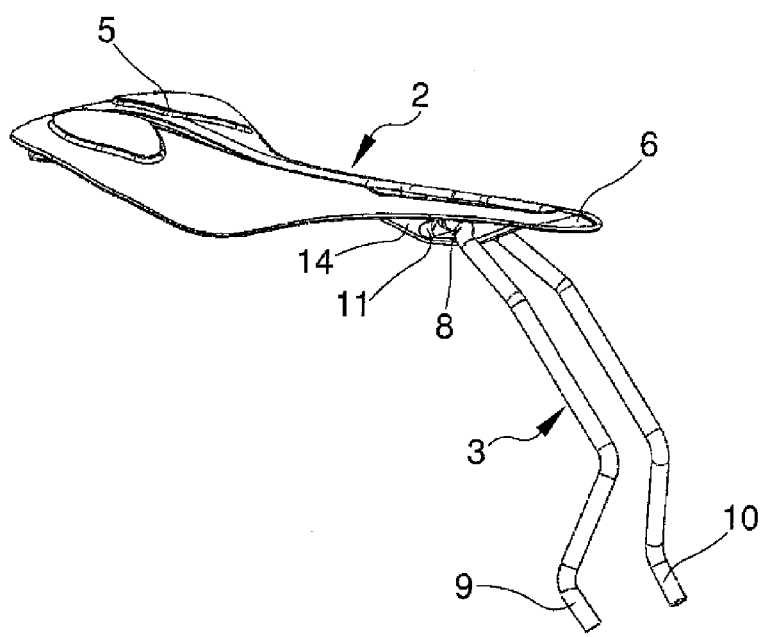
FIG. 7 is a perspective view of a phase of the assembly of the saddle, in which the rail is inserted in a passing opening in the shell.

In the front slot 11 can be inserted in detachable way the "U" shaped anterior portion 8 of the rail 3, as illustrated particularly in FIG. 7. To allow an easy insert, the front slot 11 provided with two opposite recesses 16, one for part, realized in correspondence of the back extremity of the front slot 11—well visible for instance in FIGS. 1, 5 and 6—that allow the free movement of the rail 3 during the assembly and disassembly, as it will better appear in the sequel. With reference to FIGS. 4 and 5, each of the rear slots 12, 13 are substantially pocket shaped, realized in relief on the lower surface 15 of the shell 2 below the back seat 5; each of the rear slots 12, 13 are oriented generally towards the anterior nose 6 of the saddle 1.

Figure 8:
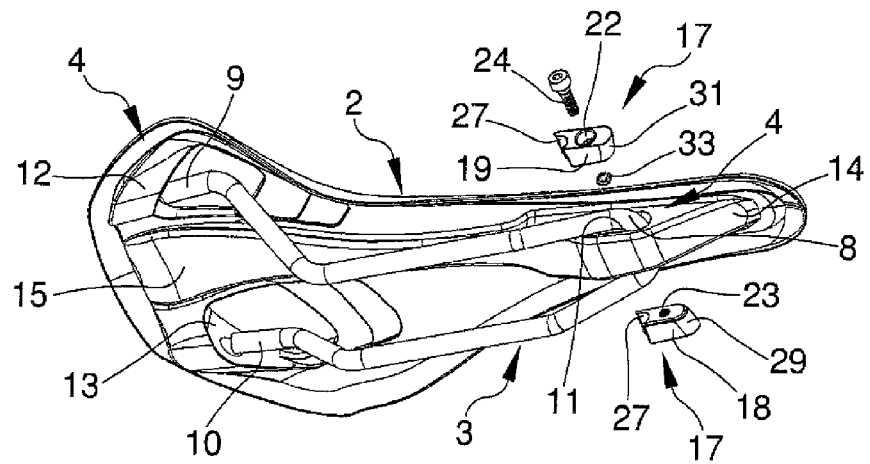
FIG. 8 is an exploded view of a further phase of the assembly of the saddle.
Figure 9:
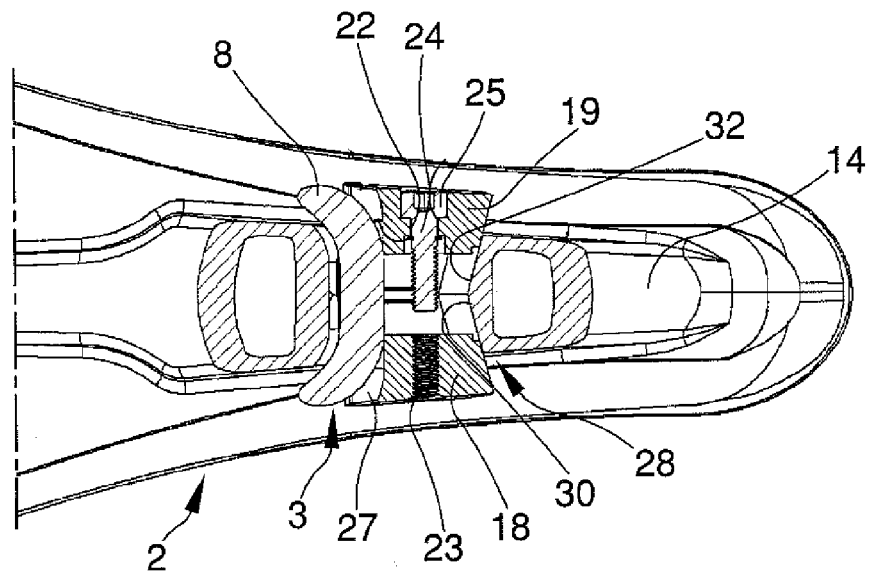
FIG. 9 is a lower view partially sectioned of the saddle during a phase of assembly.
Figure 10:
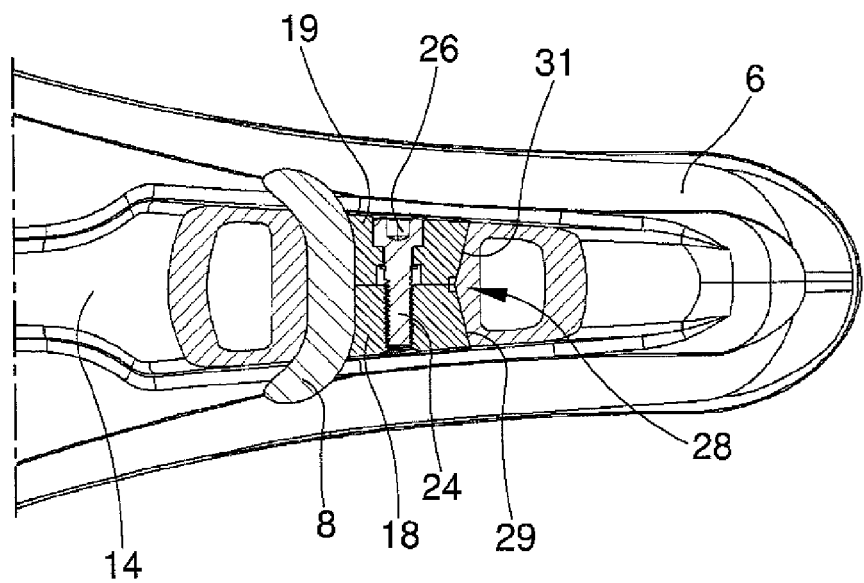
FIG. 10 is a lower view partially sectioned of the saddle when completely assembled.
Figure 11:
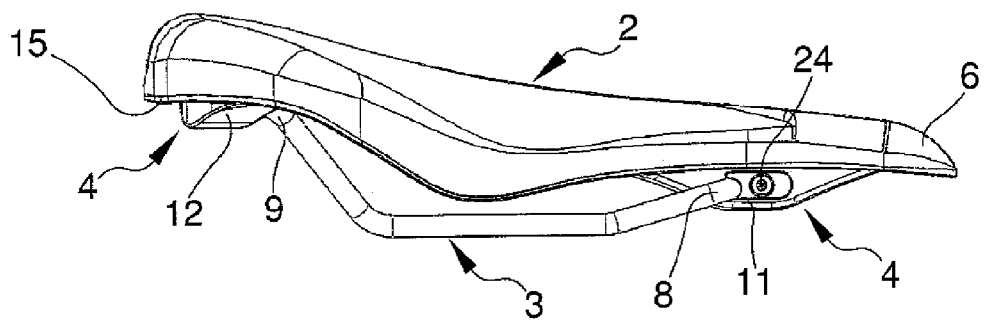
FIG. 11 is a side view of the saddle according to the invention.
Figure 12:
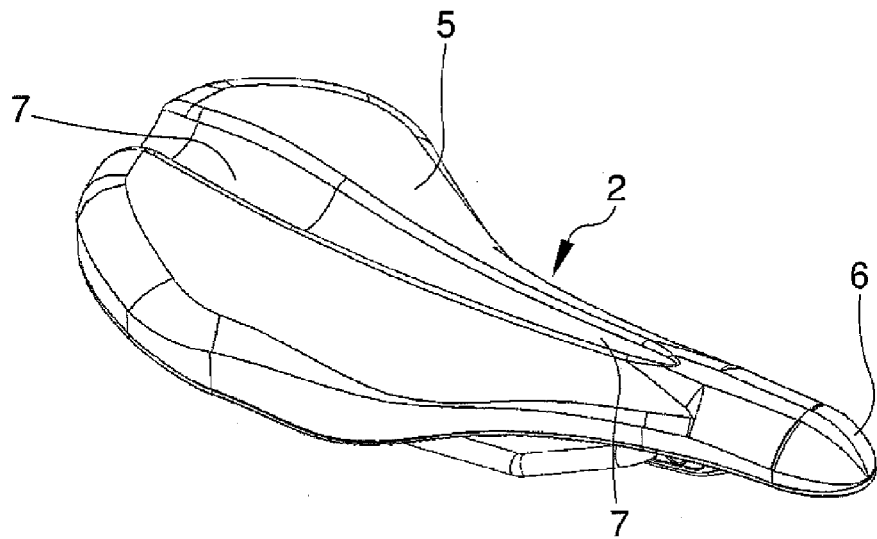
FIG. 12 is a perspective view if the saddle according to the invention.
Figure 13:
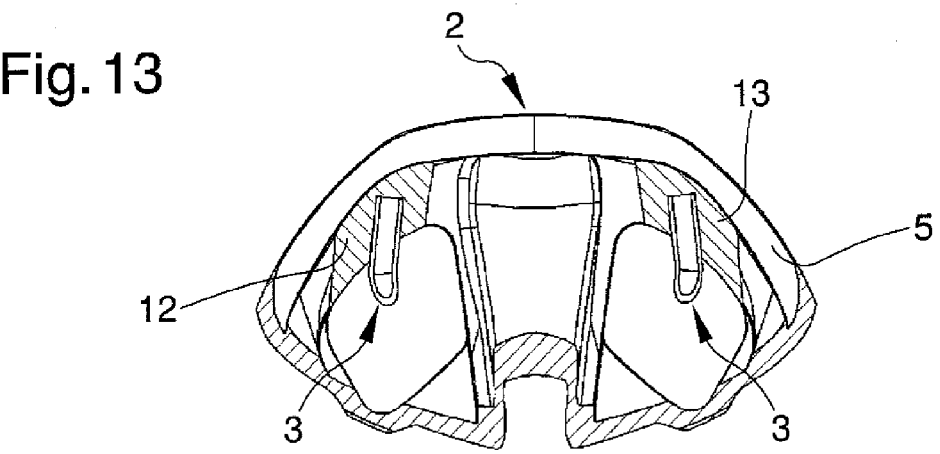
FIG. 13 is a rear view of the saddle according to the invention.

In each of the rear slots 12, 13 can be inserted in detachable way a respective rear portion 9, 10 of the rail 3, as visible for instance in FIGS. 1, 5, and 8. The fixing detachable means 4 of the rail 3 to the shell 2 include besides, more in detail, blocking means, indicated with reference numeral 17, of the anterior portion 8 of the rail 3 in the front slot 11. With particular reference to FIGS. 8, 9, 10, the blocking means 17 include in detail at least a wedge 18, that can be detachably inserted in the front slot 11 of the shell 2 and suitable for immobilizing the "U" shaped anterior portion 8 to the rail 3 with respect to the shell 2.

More particularly, the blocking means 17 include two wedges 18, 19, which can be detachably inserted in the front slot 11 from opposite sides, and which can be detachably mutually coupled to immobilize the anterior portion 8 of the rail 3 with respect to the shell 2. Both the wedges 18, 19 include respective holes 22, 23, for the insertion of a screw 24 suitable for fixing the wedges 18, 19 one to the other inside the front slot 11. More in detail, the left wedge 19 is provided with a left passing hole 22 and it conforms a cavity 25 for the head 26 of the screw 24; the right wedge 18, instead, is provided with a right hole 23, which is threaded thru.

Each of the wedges 18, 19, includes besides a respective recess 27, visible particularly in FIGS. 8, 9, suitable for engaging the anterior portion 8 of the rail 3. Each of such recesses 27 allows, particularly, to realize a precise and stable contact, with optimal pressure distribution, between the "U" shaped anterior portion 8 of the rail 3 and the wedges 18, 19: in this way, in use, any accidental relative movement between the shell 2 and the rail 3 is not allowed.

The blocking means 17 include besides means of regulation of the rigidity of the shell 2, indicated with reference numeral 28, visible in detail in FIGS. 9, 10. Such means of regulation 28 include at least a wedge surface 29, provided in at least one of the wedges 18, 19, suitable for engaging a correspondent tilted surface 30 conformed by the front slot 11. The aforesaid wedge surface 29 can be truncated cone shaped, visible in FIG. 8, like the complementary tilted surface 30 of the front slot 11. In alternative, such wedge surface 29 and the complementary tilted surface 30 can be plain, or of any other opportune geometry. More particularly, the aforesaid means of regulation of the rigidity 28 of the shell 2 include two wedge surfaces 29, 31, provided respectively in each of the wedges 18, 19 with opposite slopes, suitable for engaging in respective complementary tilted surfaces 30, 32 of the front slot 11.

A great or smaller penetration of the wedges 18, 19 inside the front slot 11, regulated by the user through the greatest or smaller spin of the screw 24 in the threaded hole 23, allows to impart to the rail 3, fixed in correspondence of the rear slots 9, 10, a great or smaller elastic deformation: this deformation confers to the rail 3, and therefore to the shell 2, great or smaller rigidity, in relationship to the specific needs of every user. If greater rigidity is desired, either the rail can be replaced with a longer rail or thin spacers can be placed inside rear slots 12 and 13 and then the rail re-installed into the shell 2. In the practical use, with particular reference to FIGS. 7, 8, 9, 10, the assembly method of the saddle comprises a phase of insertion of the rail 3 in the front slot 11, bringing the "U" shaped anterior portion 8 of the rail 3 to correspond to the front slot 11 itself, as illustrated in FIG. 7.

In a following phase, represented in FIG. 8, the rail 3 is turned up, inside the front slot 11, in order to bring the rear portions 9, 10 in correspondence of the rear slots 12, 13 of the shell 2.

Subsequently, the assembly of the saddle 1 comprises a phase of insertion of the rear portions 9, 10 inside the respective rear slots 12, 13.

It follows then a phase of insertion of the wedges 18, 19 in the front slot 11 from opposite sides, as illustrated in FIG. 9, so that to engage the screw 24 inside the threaded hole 23.

The assembly method finally comprises a phase of fastening the screw 24 in the threaded hole 23; as mentioned above, the greatest or smaller spin of the screw 24 allows to get, correspondingly, a great or smaller rigidity of the rail 3, and therefore also a great or smaller rigidity of the shell 2.

FIG. 10, particularly, shows a phase of assembly in which the screw 24 is completely screwed in the threaded hole 23, and therefore the wedges 18, 19 are completely engaged in the front slot 11, and they perfectly fit one another. In this situation the maximum rigidity of the rail 3 is obtained, and therefore the maximum rigidity of the shell 2 is obtained. In other words, if compared with FIG. 9, FIG. 10 shows a situation in which the rail 3 is preloaded with a compression of around 1-2 millimeters in comparison to the condition in which the wedges 18, 19 are not connected one another yet, as clearly visible in FIG. 9.

Naturally the disassembly method of the saddle 1, or rather particularly the disassembly of the rail 3 from the shell 2, to effect the reparation or the substitution of the rail 2, comprises for instance the operational phases above described performed in inverse order. In other words, it is necessary at first to remove the wedges 18, 19 from the front slot 11, completely unscrewing the screw 24; in this way the rail 3 is free to slide with respect to the front slot 11, and it is possible to pull out the rear portions 9, 10, from the rear slots 12, 13. A retaining ring 33 engaged in a groove in screw 24 causes wedges 18 and 19 to necessarily separate when unscrewing screw 24. This done, the rail 3 can be completely removed from the front slot 11 with a simple rotation and manual move.

It is so seen that the invention reaches the proposed purposes.

The possibility, guaranteed by the present invention, to separate and to reassemble, in extremely rapid and simple way, the rail 3 from the shell 2 allows the user, at his own discretion, to repair or to replace the rail 3 if this is damaged; equally, this possibility allows the user to replace the rail 3 with another one of different characteristics, for instance realized in different, according to his own tastes and his own needs.

With the saddle according to the present invention, besides it is possible to regulate, at discretion of the user, the rigidity of the shell 2 with simple and economic means, simply acting on the same screw 24 suitable for disassembling and reassembling the rail 3, as in precedence described.

The front junction of the rail 3 to the shell 2, thanks to the solution realized with the present invention, is provided in a rear position in comparison to what can be observed in the traditional saddles: in this way the nose 6 of the saddle is in a more cantilevered position, and therefore it is more flexible under the weight of the user. Furthermore, for small deflections, the anterior portion of the rail 3 acts as an axis for the shell 2 to pivot about, providing greater flexibility and movement whether on the nose of the saddle or at rear of the saddle, compared to traditional front rail to shell joining. This technical solution confers to the saddle greater characteristics of comfort and pleasantness of use.

Still a technical result reached by the saddle according to the present invention, correlated to the precedent, is constituted by the fact that the junction of the rail 3 to the shell 2, situated subsequently in a rear position in comparison to the traditional saddles, allows to realize a rail 3 of reduced total length, and therefore of reduced weight. This last result is other than secondary, since that an important fraction of the total weight of the saddle is constituted by the weight of the rail 3.

The present invention has been described according to preferred forms of realization, but equivalent variations can be conceived without going out of the field of protection offered by the claims that follow.

The invention claimed is:
1. A saddle, comprising:
a shaped shell;
a rail connecting the saddle to a seat post; and
means for fixing and detaching the rail to the shell, wherein the means for fixing and detaching comprises:
a front slot for detachable engagement of an anterior portion of the rail;
a first rear slot for detachable engagement of at least a rear portion of the rail;
a means for blocking the anterior portion of the rail in the front slot, wherein the means for blocking comprises two wedges detachably engaged in the front slot from opposite sides and detachably mutually coupled to immobilize the anterior portion of the rail with respect to the shell; and
a second rear slot for detachable engagement of at least a second rear portion of the rail, wherein the first rear slot and the second rear slot are substantially pocket shaped within a rear lower surface of the shell and oriented towards a front nose of the saddle for detachably housing the rear portion and the second rear portion of the rail.

2. The saddle of claim 1, wherein the front slot is between a curved plate and the shell.

3. The saddle of claim 2, wherein the means for blocking comprises means for regulating a rigidity of the shell.

4. The saddle of claim 2, wherein the front slot is substantially eyelet shaped and wherein the curved plate lies in a plane substantially perpendicular to the shell.

5. The saddle of claim 4, wherein the means for blocking comprises means for regulating a rigidity of the shell.

6. The saddle of claim 1, wherein the means for blocking comprises means for regulating a rigidity of the shell.

7. The saddle of claim 1, wherein the two wedges each comprise a first surface engaging a corresponding surface of the front slot.

8. The saddle of claim 7, wherein the two wedges each comprise a hole for insertion of a screw for fixing the two wedges together within the front slot.

9. The saddle of claim 8, wherein the two wedges each comprise a recess opposite a first surface engaging the anterior portion of the rail.

10. The saddle of claim 7, wherein the two wedges each comprise a recess opposite the first surface engaging the anterior portion of the rail.

11. The saddle of claim 1, wherein the two wedges each comprise a hole for insertion of a screw for fixing the two wedges together within the front slot.

12. The saddle of claim 11, wherein the two wedges each comprise a recess opposite a first surface engaging the anterior portion of the rail.

13. The saddle of claim 1, wherein the two wedges each comprise a recess opposite a first surface engaging the anterior portion of the rail.

* * * * *